(12) United States Patent
Borg et al.

(10) Patent No.: US 12,413,645 B1
(45) Date of Patent: *Sep. 9, 2025

(54) SYSTEM AND METHOD FOR REMOTE APPLICATION SHARING

(71) Applicant: PARALLELS INTERNATIONAL GMBH, Schaffhausen (CH)

(72) Inventors: Marco Borg, Sliema (MT); Daniel Farrugia, Sliema (MT); Nikolay Dobrovolskiy, Moscow (RU); Sergei Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 89 days.

This patent is subject to a terminal disclaimer.

(21) Appl. No.: 18/510,918

(22) Filed: Nov. 16, 2023

Related U.S. Application Data

(63) Continuation of application No. 17/557,736, filed on Dec. 21, 2021, now Pat. No. 11,831,723, which is a continuation of application No. 16/214,314, filed on Dec. 10, 2018, now abandoned.

(51) Int. Cl.
| | |
|---|---|
| *G06F 15/16* | (2006.01) |
| *H04L 9/40* | (2022.01) |
| *H04L 67/01* | (2022.01) |
| *H04L 67/141* | (2022.01) |
| *H04L 67/146* | (2022.01) |
| *H04L 67/53* | (2022.01) |

(52) U.S. Cl.
CPC .......... *H04L 67/141* (2013.01); *H04L 63/08* (2013.01); *H04L 67/01* (2022.05); *H04L 67/146* (2013.01); *H04L 67/53* (2022.05)

(58) Field of Classification Search
CPC ......... H04L 63/08; H04L 67/01; H04L 67/53; H04L 67/141; H04L 67/146
USPC .......................................................... 709/203
See application file for complete search history.

(56) References Cited

U.S. PATENT DOCUMENTS

| | | | | |
|---|---|---|---|---|
| 6,748,420 B1 * | 6/2004 | Quatrano | .............. | H04L 67/142 709/227 |
| 6,826,600 B1 * | 11/2004 | Russell | ............... | H04L 67/1091 704/214 |
| 7,933,956 B2 * | 4/2011 | Hon | ........................ | G06F 16/44 709/205 |

(Continued)

*Primary Examiner* — Moustafa M Meky
(74) *Attorney, Agent, or Firm* — Rosenberg, Klein & Lee

(57) ABSTRACT

Systems and methods are disclosed herein for remote application sharing. An exemplary method comprises detecting a user establishing a connection with a remote application server, authenticating the user based on login information associated with the user, determining that the user has requested execution of a shared application hosted on the remote application server, responsive to determining that the user has requested execution of the shared application, gathering information for accessing the shared application hosted on the remote application server, establishing a user session for executing the shared application, generating an application link comprising the information for accessing the shared application over the user session and publishing the application link for distribution to one or more third party users, wherein activation of the application link by the one or more third party users shares the user session with the one or more third party users.

9 Claims, 11 Drawing Sheets

(56) References Cited

U.S. PATENT DOCUMENTS

| | | | | |
|---|---|---|---|---|
| 7,945,622 B1* | 5/2011 | Pegg | | G06Q 10/10 709/204 |
| 7,996,237 B2* | 8/2011 | Vedula | | G06Q 10/10 709/204 |
| 8,266,209 B2* | 9/2012 | Pegg | | H04N 7/15 709/204 |
| 8,464,164 B2* | 6/2013 | Hon | | G06F 16/954 715/752 |
| 8,583,619 B2 | 11/2013 | Ghods et al. | | |
| 8,935,334 B2* | 1/2015 | Hon | | G06F 16/44 709/205 |
| 9,137,029 B1* | 9/2015 | Vasquez | | H04L 12/185 |
| 9,178,957 B2* | 11/2015 | Pegg | | G06Q 10/10 |
| 9,425,973 B2* | 8/2016 | Quinn | | H04L 12/1827 |
| 9,756,139 B2* | 9/2017 | Memon | | H04W 4/024 |
| 9,876,827 B2* | 1/2018 | Chew | | G06Q 50/01 |
| 9,961,085 B2* | 5/2018 | Raghavendra | | G06F 21/30 |
| 10,097,404 B2* | 10/2018 | Yadav | | H04L 67/52 |
| 10,142,422 B2* | 11/2018 | Wang | | H04L 67/125 |
| 10,382,547 B2* | 8/2019 | Berger | | G06Q 10/101 |
| 10,440,131 B2* | 10/2019 | Memon | | H04W 4/024 |
| 10,581,939 B2* | 3/2020 | Ingale | | H04L 65/403 |
| 10,673,939 B2* | 6/2020 | Vysotsky | | G06F 9/45545 |
| 10,992,761 B2* | 4/2021 | Memon | | H04L 67/53 |
| 11,019,144 B2* | 5/2021 | Berger | | H04L 67/1095 |
| 11,113,118 B2* | 9/2021 | Anakkot | | H04L 67/61 |
| 11,831,723 B2* | 11/2023 | Borg | | H04L 65/1063 |
| 2007/0198534 A1* | 8/2007 | Hon | | G06F 16/44 |
| 2009/0179983 A1 | 7/2009 | Schindler | | |
| 2012/0260195 A1* | 10/2012 | Hon | | G06F 16/954 715/753 |
| 2012/0331402 A1* | 12/2012 | Hon | | G06F 16/44 715/756 |
| 2013/0061155 A1* | 3/2013 | Hon | | G06F 16/44 715/753 |
| 2013/0067100 A1 | 3/2013 | Kuzin et al. | | |
| 2014/0101310 A1 | 4/2014 | Savage et al. | | |
| 2014/0280845 A1* | 9/2014 | Owens | | H04L 67/61 709/223 |
| 2015/0006308 A1* | 1/2015 | Lin | | G06Q 30/0633 705/26.2 |
| 2015/0180983 A1 | 6/2015 | Hitomi et al. | | |
| 2016/0191637 A1* | 6/2016 | Memon | | G06Q 50/01 709/204 |
| 2016/0198017 A1 | 7/2016 | Alten | | |
| 2017/0339237 A1* | 11/2017 | Memon | | G06F 3/04842 |
| 2018/0063205 A1 | 3/2018 | French | | |
| 2018/0219923 A1* | 8/2018 | Berger | | G06Q 10/101 |
| 2018/0315331 A1 | 11/2018 | Petscher et al. | | |
| 2019/0238599 A1* | 8/2019 | Ingale | | G06F 9/452 |
| 2020/0092384 A1* | 3/2020 | Memon | | G01C 21/34 |

\* cited by examiner

SYSTEM AND METHOD FOR REMOTE APPLICATION SHARING

CROSS-REFERENCE TO RELATED APPLICATION

This application claims the benefit of priority as a continuation of U.S. patent application Ser. No. 17/557,736 filed Dec. 21, 2021; which itself claims the benefit of priority from U.S. patent application Ser. No. 16/214,314 filed Dec. 10, 2018; the entire contents of each being incorporated herein by reference.

FIELD OF TECHNOLOGY

The present disclosure relates generally to the field of computer virtualization, and more specifically, to systems and methods for remote application sharing.

BACKGROUND

There are currently two known ways that a user can launch remote applications: using a remote application client or using a web-based gateway. To launch an application using a remote application client, the user must download and install a remote application client compatible with the operating system installed on their device. Then, the user must establish a connection to a remote server by providing the server name or network address of the server, port(s), connection modes, username and password, and other identifying information for the server. Once the user establishes a connection with the remote server, authenticates his or herself, an application listing is provided to the user, and the user can ultimately launch the application.

Another way users can access remote applications is to launch a Web Browser, navigate to a web-based remote application gateway by entering a previously known or provided URL into the browser, and input the credentials to login and access the application listing. A user must perform these steps on each machine where the user desires to use the published application(s), a cumbersome and error prone process.

Using the methods described above however, users launch and work with different sessions. For example, if a user launches an application using a remote application client, and another user launches the same application, two separate sessions for the application are created. Currently, there is no simple way for a user to share the application session with another user. To achieve something similar, the user may need to perform a series of cumbersome configuration steps, for example, using Microsoft® terminal services client (MSTSC). Sharing sessions using MSTSC comprises, at a minimum, configuring a group policy object (GPO) to allow or deny silent shadow (control), obtaining a session identifier, initiating a remote connection using specific commands, and waiting for user to accept access. Furthermore, while administrators can shadow a remote desktop session host (RDSH) session of a user using a remote administration console, the administrator cannot share the session of a particular application.

SUMMARY

The present disclosure provides an effective solution for the foregoing problems of conventional techniques associated with remote application sharing. Disclosed are example systems, methods and computer program products for remote application sharing.

In an exemplary aspect, a disclosed method comprises detecting a user establishing a connection with a remote application server, authenticating the user based on login information associated with the user, determining that the user has requested execution of a shared application hosted on the remote application server, responsive to determining that the user has requested execution of the shared application, gathering information for accessing the shared application hosted on the remote application server, establishing a user session for executing the shared application, generating an application link comprising the information for accessing the shared application over the user session and publishing the application link for distribution to one or more third party users, wherein activation of the application link by the one or more third party users shares the user session with the one or more third party users.

In another aspect, the method further comprises further comprising determining that the user requested to share the user session executing the application, and responsive to determining the user request, generating the application link.

In another aspect, the application link is a file containing a uniform resource locator (URL) to the user session for executing the shared application.

In another aspect, the application link comprises connection details for connecting to the user session.

In another aspect, the method further comprises determining that a new user has activated the application link, authenticating the new user using the remote application server, determining that a device of the new user has a native client associated with the remote application server, installed, responsive to determining that the device has the native client, calling the native client to launch, via the application link, the shared application, and joining the new user with the existing user session executing the shared application.

In another aspect, the method further comprises determining that the existing user session executing the shared application on the remote application server has expired or is not present, establishing a new session on the remote application server; and executing the shared application in the new session.

In another aspect, the method further comprises providing an administrator of the remote application server with a list of running published applications per user that can be shadowed individually, allowing the administrator to share a session associated with each application in the list.

In one aspect, a system is provided, the system comprising a hardware processor configured to detect a user establishing a connection with a remote application server, authenticate the user based on login information associated with the user, determine that the user has requested execution of a shared application hosted on the remote application server, responsive to determining that the user has requested execution of the shared application, gather information for accessing the shared application hosted on the remote application server, establishing a user session for executing the shared application, generate an application link comprising the information for accessing the shared application over the user session and publishing the application link for distribution to one or more third party users, wherein activation of the application link by the one or more third party users shares the user session with the one or more third party users.

According to another exemplary aspect, a computer-readable medium is provided comprising instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for remote application sharing. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
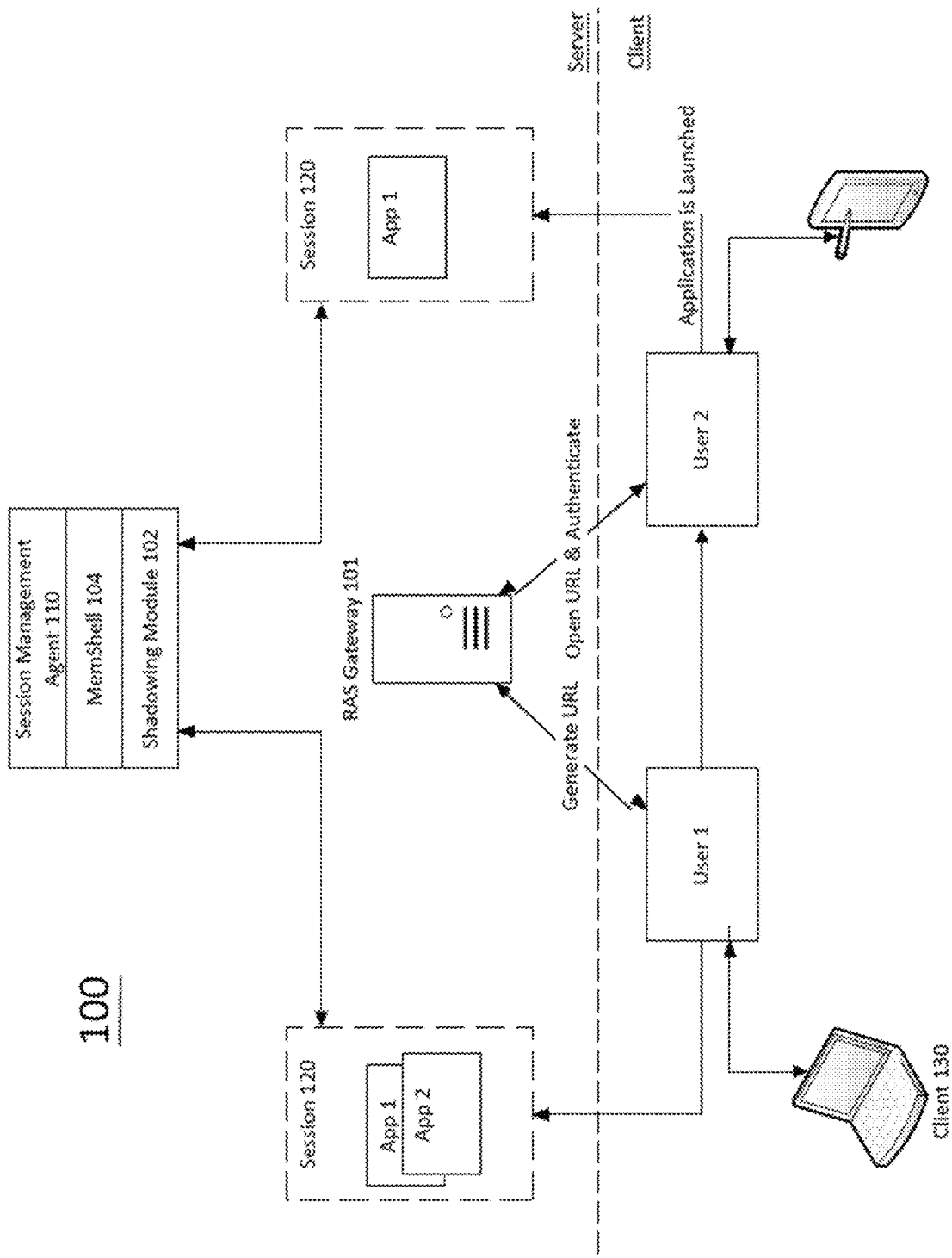
FIG. 1 is a block diagram illustrating a system for remote application sharing using an application link, according to an exemplary aspect of the disclosure.

FIG. 1 is a block diagram illustrating a system 100 for remote application sharing using an application link, according to an exemplary aspect of the disclosure.

According to exemplary aspects, the system 100 comprises a remote application server (RAS) Gateway 101 (or simply RAS 101), a shadowing module 102, and memory shell (Memshell) 104. Client devices, e.g. clients 130 and 132, can connect to the RAS gateway 101, generally secured by encryption, to launch and use remote applications that are published for execution. The session management module 110 tracks each session in each application on the server side by MemShell 104, and reports the actions to third party users such as User 2. Subsequently, a user such as User 1 using client 130 is authenticated via the RAS Gateway 101 to establish an application session 120 with the RAS gateway 101. In some aspects, the User 1 accesses the RAS gateway 101 via a native client, while in other aspects, the User 1 accesses the RAS gateway 101 via a web client (e.g., via a website).

In some embodiments, the RAS 101, or a portion of RAS 101 such as a remote desktop protocol (RDP) server, passes on the request (e.g., via a virtual channel) to the Memshell component (or simply Memshell) 104. Memshell 104 performs the processing and calculations involved in launching the published remote applications.

User 1 may launch any number of applications that are published by the RAS gateway 101. Generally, when User 1 launches the session 120, the user is presented with a list of applications that are already published and available for execution. User 1 may select one or more applications and launch these applications. Upon launch of these applications, application session 120 is established between the MemShell 104 and the client 130 for User 1. In FIG. 1, the User 1 launches Application 1 and Application 2 in session 120. Application 1 and Application 2 are managed by the MemShell 104 and the output is transmitted to the client 130 via a transmission channel to a native client installed on the client 130, or to a web browser being executed on Client 130.

In order to share, for example, Application 1, with another user, the User 1 requests the RAS gateway 101 to generate an application link that is shareable. The generated application link is then shared with User 2 on client device 132. In this aspect, when the RAS Gateway 101 detects that User 2 has activates the application link, for example using a browser or a native client on client device 132, the RAS Gateway 101 shares application session 120 for Application 1 with User 2. In an exemplary aspect, the shadowing module 102 joins the User 2 to session 120. In some aspects, the shadowing module 102 is distinct to the type of environment the user 1 is using. For example, in Windows, a native sharing driver is provided, while in other operating systems, similar mechanisms are provided. The User 2 now may use the Application 1 and view the use of Application 1 by the User 1, and the two users may share input, tutorials, collaborate with each other, or the like, without consuming the resources required of a newly launched copy of Application 1.

Further, when User 2 activates the application link, the user launches a web browser and is redirected to a web gateway (e.g., an HTML 5 gateway). The HTML 5 gateway connects to the RAS Gateway 101 that determines whether the session 120 is still active. If the session 120 is no longer active, the RAS Gateway 101 initiates a new application session and launches the application therein. User 2 may share their application session by passing on the existing application link to other users, without requesting that the RAS Gateway 101 generate a new link. If the session does not (or no longer) exists when User 2 attempts to connect, User 2 will receive an error. The user who initially shared the application has control over the session. Therefore, the link invalidates once User 1 logs out of the session. Also, in some aspects a link is only valid to a particular user or users which User 1 has specified when creating the sharable application link. In some aspects, User 1 may decide to create a shareable application link which any user can access.

According to some aspects, the user can allow a third party gradated access permissions to the shared application. For example, the user can allow, view or edit permissions to the shared applications. In view mode, the third party can only view the users actions in the session, while in edit mode, the user may allow access to one or more operations of the application in the session. For example, if the application being shared is AutoCAD, the connected users can see what the owner (the initiating user) is designing. The owner can optionally allow some of the connected users to make changes in the AutoCAD design as well. In some aspects, the permissions are decided prior to generating the application link, while in other aspects, the user can change permissions during the session. In one aspect, view and edit permissions are enforced on the web gateway by blocking inputs such as keystrokes and mouse movements in the case of view only permissions. The owner can decide to close the session if he or she logs out or can also decide to keep the session running until the last user logs off. In one aspect, the session management module 110 contacts the web gateway to disconnect other users from the session. In case of a portable shared application (as shown in FIG. 2), by default the session will be closed after the last user logs off.

According to some aspects of the disclosure, the owner may share a specific application rather than all applications in the session 120. Moreover, the owner may share certain applications with particular users, while sharing other applications with different users. For example, AutoCAD may be shared with users A and B, while "ArcGIS" can be shared with users X and Y. The owner can grant permission to user A to edit the AutoCAD designs and user X the ArcGIS map (simultaneous editing) while restricting users B and Z to view-only. The administrator can also publish a portable shared application (see FIG. 2) which will allow users to connect/create a shared application. In one aspect, the portable shared application is a file which a user can open to connect to a shared session. In this aspect, the portable shared application may be an HTML page or file that can be launched using a web browser.

In previous web-based approaches to sharing, such as Google® Docs®, since legacy software applications (particularly bespoke applications, or legacy Windows® applications) may be shared, that are not designed for sharing.

Figure 2:
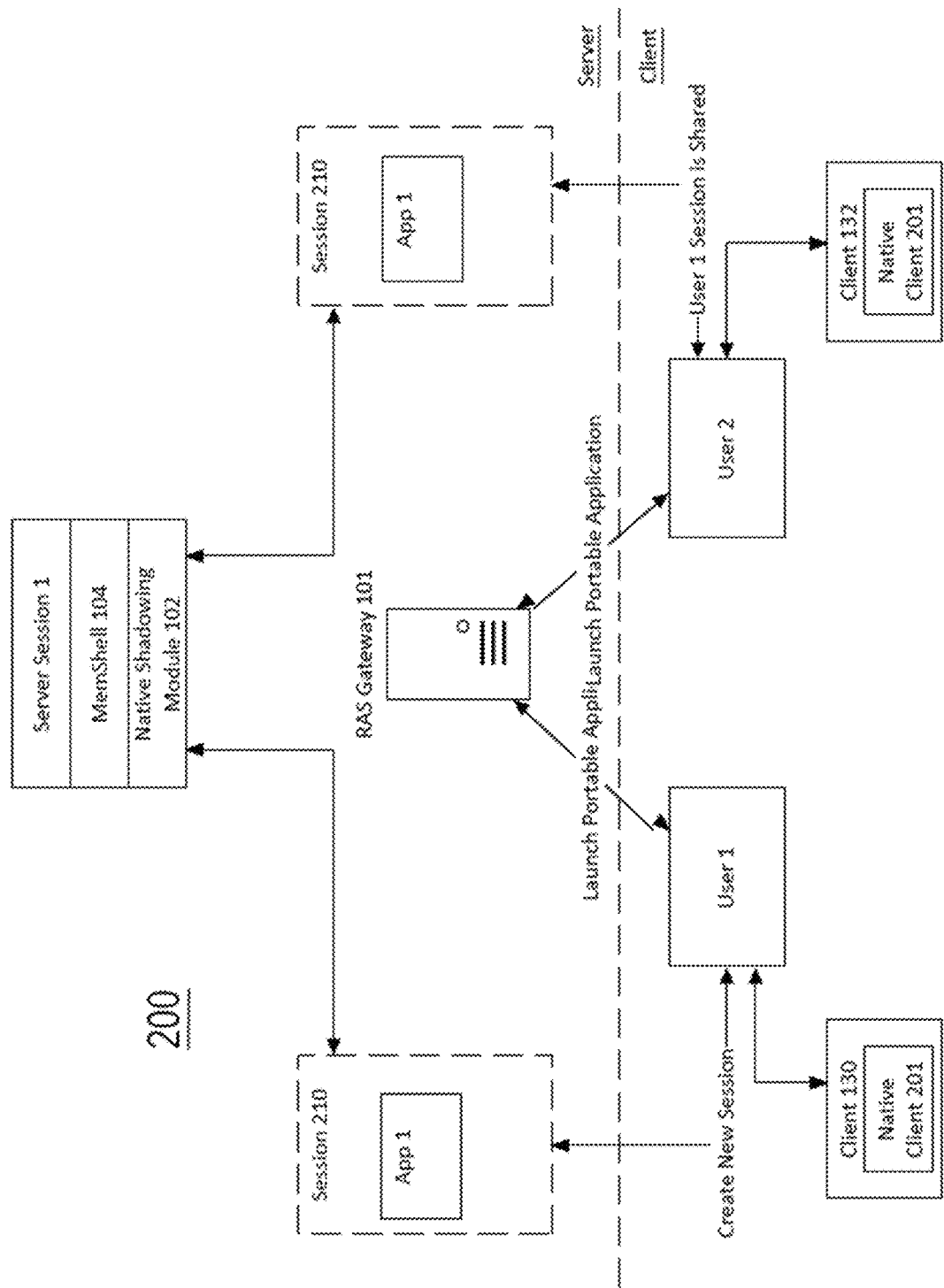
FIG. 2 is a block diagram illustrating a system for remote application sharing using a portable application, according to an exemplary aspect of the disclosure.

FIG. 2 illustrates a system 200 of remote application sharing using a portable application, instead of using an application link.

According to exemplary aspects, the portable application is a set of instructions that are executed by a native client 201 residing on client device 130 and client device 132. User 1 requests the RAS Gateway 101 to launch a portable application via the native client 201. The RAS Gateway 101 requests the MemShell 104 to create a new session for application 1. The session 210 is passed to User 1 using the native client 201, where application 1 is executing.

The native client 201 is a native application written for a target platform (e.g. iOS, Android, Windows, and the like) that has the ability to render to the screen of a client device and access devices using native OS APIs. In one aspect, the native Client 201 is invoked by registering a URL schema with an OS of the client device. For example, the URL schema may look like "PRLCLIENT:// command=launch_app". When this particular URL is processed by a browser on the client device 201, the OS will launch the native Client with the specified command. The URL Schema is a standard feature offered by an OS to register specific applications (such as the native application) with URL protocols.

Subsequently, User 1 may desire that a second user, User 2, collaborate with User 1 in the use of Application 1. User 1 requests, using the native client 201, that the RAS Gateway 101 generate a portable application. User 1 then may share this portable application as a file with User 2, via a thumb drive, or other storage or transmission mechanism. User 2 launches the portable application through the provided thumb drive or other storage, and the RAS Gateway 101 authenticates the User 2. RAS Gateway 101 then retrieves existing session 210, and provides the session 210 to User 2, allowing User 2 to join session 210 executing Application 1. In an alternative aspect, the user 1 shares the Application 1 with user 2 and may set or manage permissions with respect to the use of the Application 1.

Similar to system 100, if the session 210 is not active or has been terminated when User 2 activates the portable application, the RAS Gateway 101 delegates the creation of a new session to MemShell 104, and launches Application 1. The RAS Gateway 101 provides that session to User 2. In this aspect, User 2 does not require the installation of a native client, nor does User 2 require a web browser to launch the application and can simply execute the provided portable shared application file.

The RAS Gateway 101 delegates joining of the session to the shadowing module 102 that operates differently depending on the underlying operating system. For example, in Microsoft® Windows®, the Shadowing Module 102 allows multiple users to connect to the same session using native OS functionality. Native Shadowing is a screen sharing feature offered by some operating systems. On certain Windows versions, such as Windows Home editions, this feature is unavailable. In one aspect, screen sharing is implemented by the session management module 110.

Figure 3:
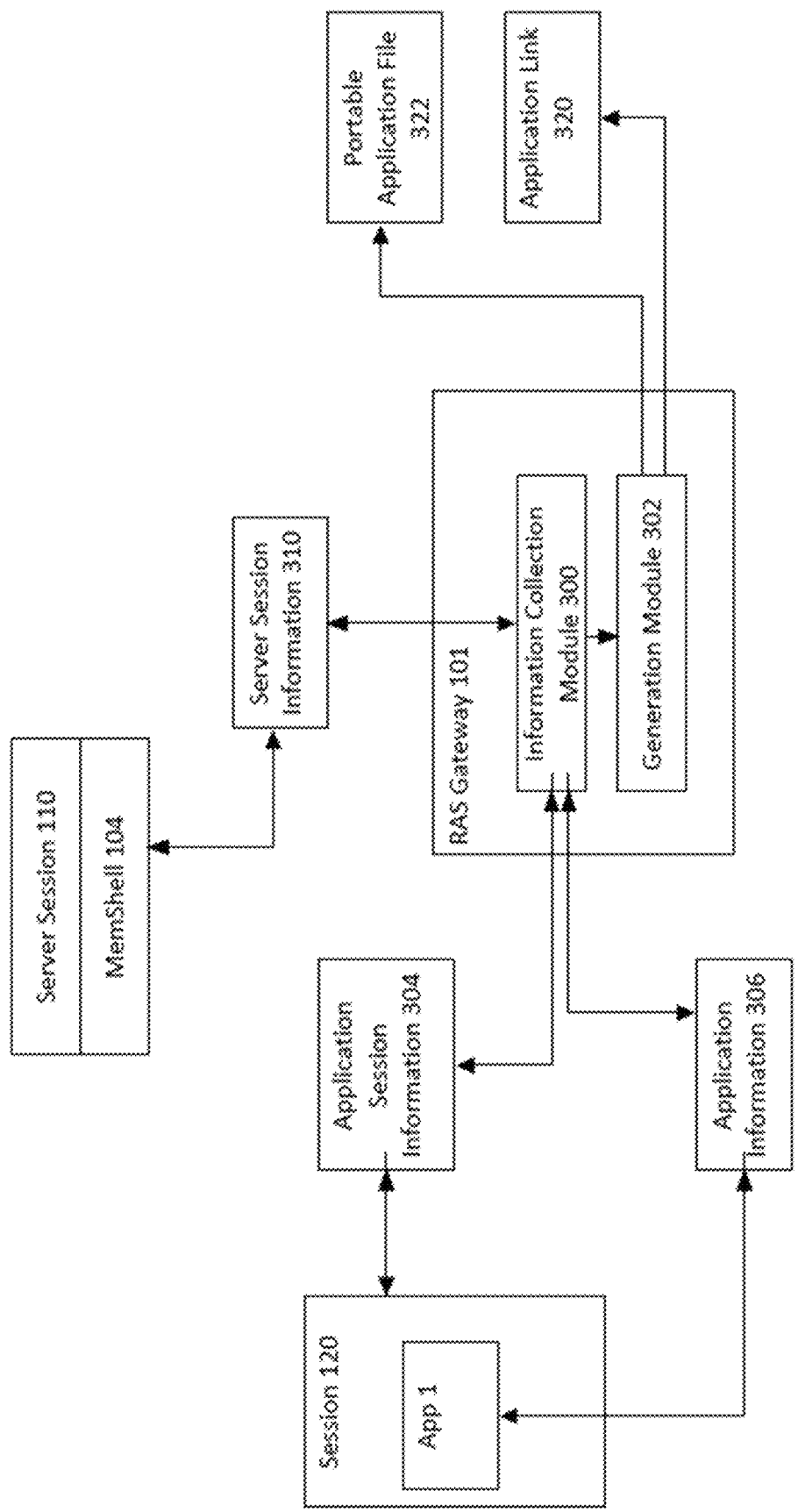
FIG. 3 is a block diagram illustrating the RAS Gateway in further detail, in accordance with exemplary aspects of the present disclosure.

FIG. 3 is a block diagram illustrating the RAS Gateway 101 in further detail, in accordance with exemplary aspects of the present disclosure.

In this aspect, the RAS Gateway 101 comprises an information collection module 300 and a generation module 302. If a user desires to share an application in a session with another user, a web gateway or a native client, requests generation of an application link 320 or a portable application file 322. The RAS Gateway 101 collects information from the various components of system 100 (or system 200) to generate the link and file.

In this particular aspect, the information collection module 300 of the RAS Gateway 101 may collect application information 306 regarding the application 1 and application session information 304 about the session 120 of FIG. 1 or session 210 in FIG. 2. In some aspects the application information 306 may include the application name, application identifier, layout information and the like. In order to generate a link to the session, in one aspect the information 306 may include the application identifier, session identifier, server name, identifying address or server identifier, and a guest user token. In this aspect, the user token is a unique identifier that will be generated by a client (e.g., a RAS client, web client, or the like) as a security measure to ensure only allowed users can connect. An example of a generated link may resemble the following: "https://RASGateway/launchsharedapp?sessionid=123&server=rdshServer1&appid=1&token=3 213565786786786873489603974598634"

Once activated by another user, the link opens in a web browser and directs the web browser to the HTML5 Gateway that first prompts the user for authentication credentials, and then validates all the parameters passed with the RAS gateway 101. For instance, if the token is valid and if the user is permitted to shadow the application, then a connection will be established with an RDSH server and the window contents are forwarded back to the user.

Furthermore, the collection module 300 of the RAS Gateway 101 may also collect server session information 310 that comprises, in some aspects server operating system information such as version, name, technical identifier, and the like. The information collection module 300 provides this information to the generation module 302. The generation module 302 then generates an application link 320 or a portable application file 322, depending on the request from the client device.

Figure 4:
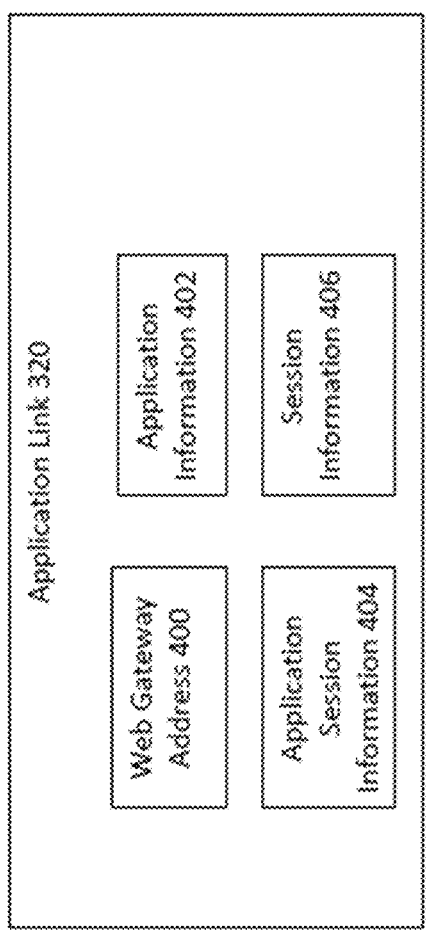
FIG. 4 illustrates the components of an Application Link in accordance with exemplary aspects of the present disclosure.

For example, FIG. 4 illustrates the components of an Application Link 320. The application link 320 may comprise a web gateway address 400, application information 402, application session information 404 and session information 406. In some aspects, the application link 320 further may include any information that can be used to identify the particular session a user desires to join. In some aspects, the application link 320 is a uniform resource locator (URL) for the web gateway of the system 100, that invokes the shadowing module 102 to allow shadowing of application sessions by multiple users. In this aspect, the application information 402, the application session information 404, and the session information 406 are concatenated to the URL string as parameters and value pairs. In another embodiment, the application link 320 is a URL connection object that creates session objects holding information 402-406, preventing sessions from being hijacked by third parties. In some aspects, the URL string and session information is encrypted to prevent hijacking or misuse by third parties.

In some aspects, the portable application file 322 is a binary (executable) or script file that does not require a client to have a native client installed. The portable application file 322 may be, for example, an HTML file that launches a URL that redirects to the web gateway to join an existing session. In other aspects, the portable application file 322 may launch a copy of the native client that connects to RAS Gateway 101, and authenticates the user, and then joins the existing session 120.

Figure 5:
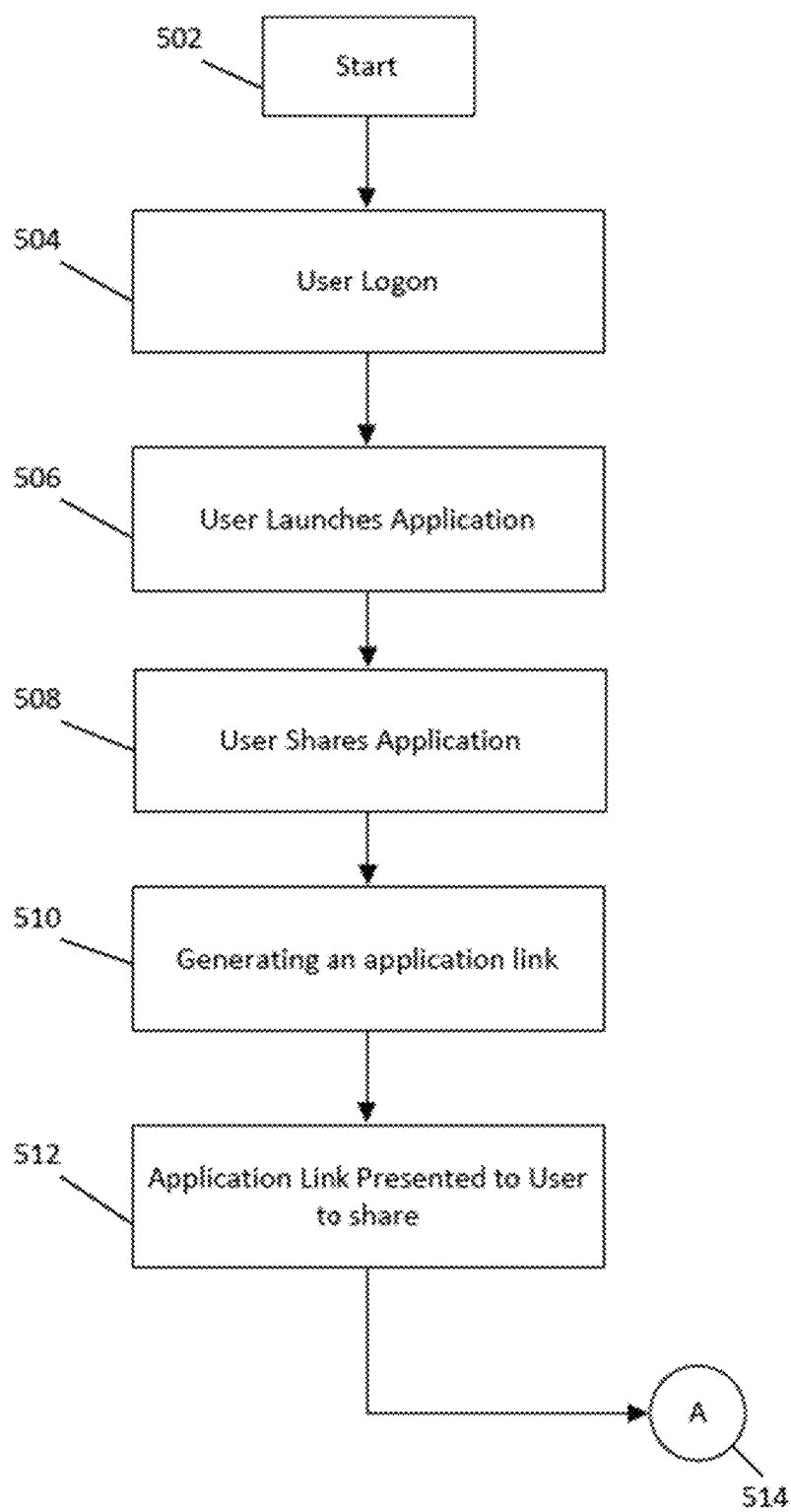
FIGS. 5-6 are flowcharts illustrating a method for remote application sharing, according to an exemplary aspect of the disclosure.

FIG. 5 is a flowchart illustrating a method 500 for remote application sharing, according to an exemplary aspect of the disclosure.

The method begins at 500 and proceeds to 502. At 504, a user logs on to a web gateway that connects to the RAS Gateway 101, according to exemplary aspects. In some aspects, the web gateway is an HTML 5 gateway, though other configurations are contemplated by the present disclosure.

At 506, the user is presented with a collection of one or more applications that have been published through the RAS Gateway 101, in the form of an application launch interface such as a list or grouping according to category or type of application.

At 508, the user desires to share their application, so the web gateway generates a request that is transmitted to the RAS Gateway 101. At 510, the RAS Gateway 101 generates an application link that comprises a link and connection details for connecting to the RAS Gateway and joining an application session. As described above, the URL may be concatenated with application and session information, or this information may programmatically be included in a session created when activating the link.

At 512, the web gateway receives the application link for the user to share with other users or third parties.

Figure 6:
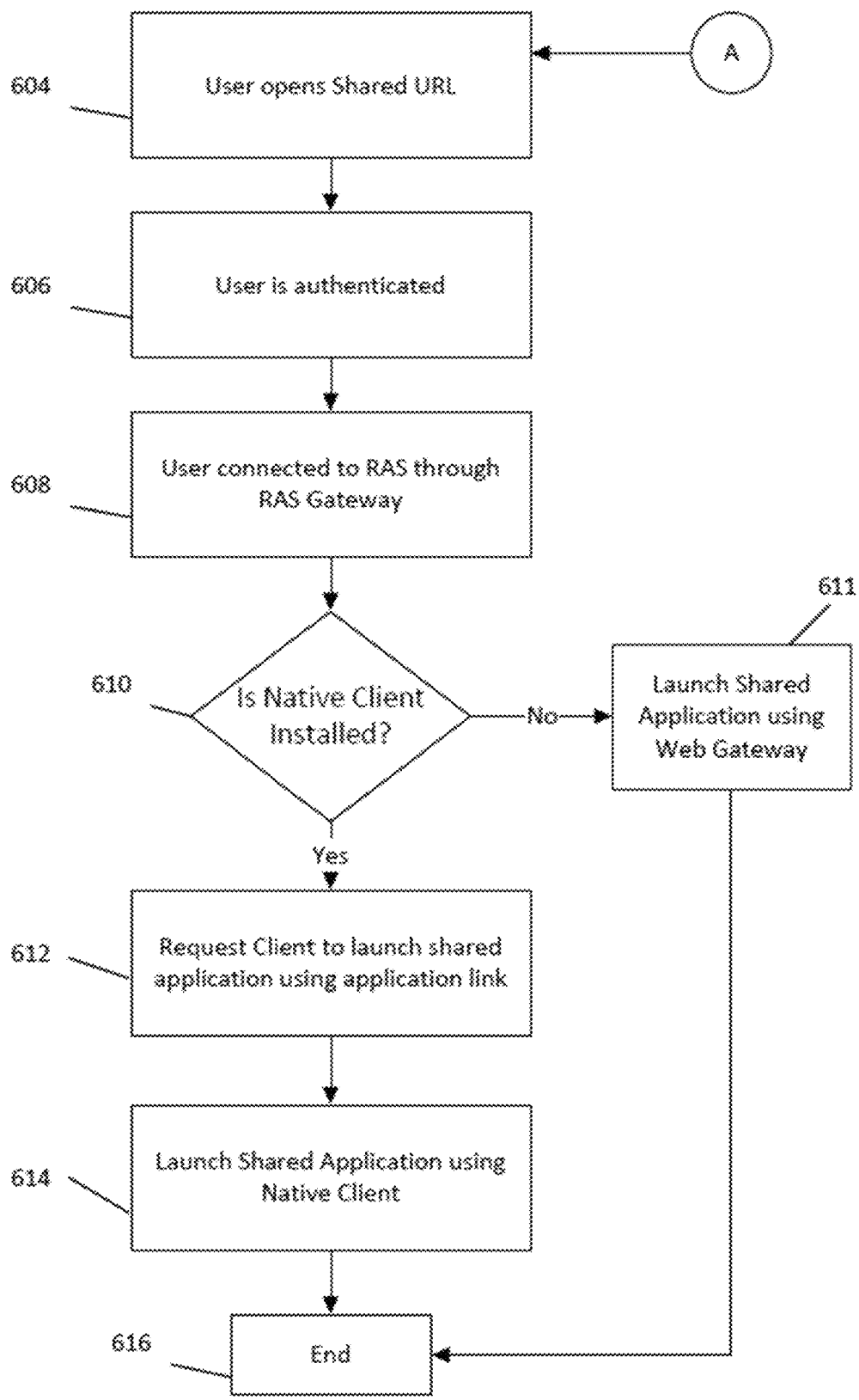

The method 500 then proceeds to step 604 shown in FIG. 6 which describes another user or third party that receives the application link.

At 604, a user that has received the application link opens the application link. In some aspects, this comprises a user selecting a textual representation of the application link (e.g., a URL), copying the text and pasting the URL into a web browser. In another aspect, the user merely clicks on the application link, causing a browser to open pointing to the indicated URL.

At 606, the user is authenticated. In some aspects, user authentication information is collected from a client device of the user—e.g., identification information is extracted from a current user session on the client device. In other aspects, the user must enter their login information. The RAS Gateway 101 authenticates the user according to the entered or collected authentication information to confirm that the user may access the session and application indicated in the URL.

The user is then connected to the remote application server (RAS) through the RAS Gateway 101 at 608.

If the user entered a URL into the web browser, the web gateway determines at 610 whether the user has a native client installed on their client device. The native client is a small executable that can launch a remote application through a connection to the RAS gateway 101 via a plurality of communication channels, where the RAS gateway 101 establishes a tunnel between the client and a RDSH server.

According to some aspects of the disclosure, the web gateway relies on an underlying Operating System call to determine whether the native client is installed on the client device. If the native client is installed, the web gateway attempts to request that the operating system pass on the execution request to the native client.

The method proceeds to 611, when the client device does not have a native client installed. At 611, the application indicated in the application link is launched using the web gateway (e.g., an HTML 5 Gateway). In some aspects, if the OS prevents the web gateway from accessing the native client, at step 610, the method proceeds to step 611 as if the native client is not installed. The HTML5 gateway determines whether the native client is installed or not. In one aspect, a URL Scheme is used to try to communicate with the native client. In this aspect, if the communication fails, it is determined that the native client is not installed.

However, if at 610 it is determined that a native client is installed, the method proceeds to 612. At 612, the web gateway requests that the native client launch the shared application using the provided application link, for example by making a system call to the underlying Operating System of the client device. In some aspects, the web gateway passes application and session information to the native client using inter-process communication (IPC), URL Schemes or the like or the like to pass data.

At 614, the native client launches the shared application using the provided application link or using the provided parameters of the application from step 612.

The method terminates at step 610.

Figure 7:
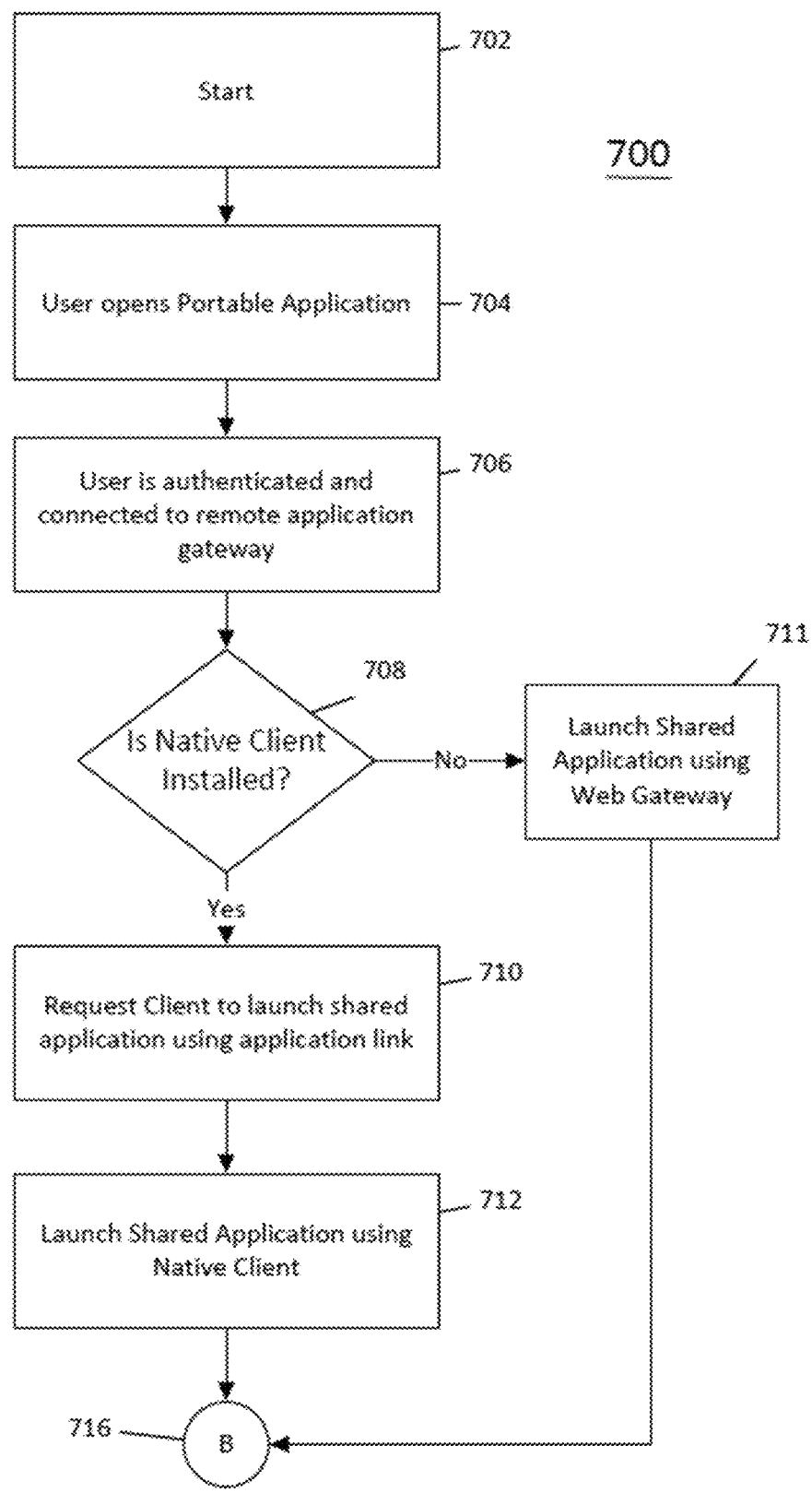
FIGS. 7-8 are flowcharts illustrating a method for remote application sharing using a portable application, according to an exemplary aspect of the disclosure.

FIG. 7 is a flowchart illustrating a method 700 for remote application sharing using a portable application, according to an exemplary aspect of the disclosure.

In this method, a user has received a portable application file that contains information used to share an application session.

The method 700 begins at step 702 and proceeds to 704.

At 704, a user that has received the portable application file opens the portable application file. In one aspect, the user clicks or otherwise activates the portable application file.

At 706, the user is authenticated. In some aspects, user authentication information is collected from a client device of the user—e.g., identification information is extracted from a current user session on the client device. In other aspects, the user must enter their login information. The RAS Gateway 101 authenticates the user according to the entered or collected authentication information to confirm that the user may access the session and application indicated in the URL.

The user is then connected to the remote application server (RAS) through the RAS Gateway 101.

The portable application determines at 708 whether the user has a native client installed on the client device. The native client is a small executable that can launch a remote application through a connection to the RAS via a plurality of communication channels. In some embodiments, this includes a binary protocol over TCP/SSL which avoids the overhead of Web Sockets, HTTPS and other web technologies.

According to some aspects of the disclosure, the portable application file relies on an Operating System call of the client device to determine whether the native client is installed on the client device. If the native client is installed, the portable application file attempts to request that the operating system pass on the execution request to the native client.

The method proceeds to 711, when the client device does not have a native client installed. At 711, the application indicated in the portable application file is launched using the web gateway (e.g., an HTML 5 Gateway). In some aspects, if the OS prevents access to the native client, at step 708 the method proceeds to step 711 as if the native client is not installed.

However, if at 708 the portable application file determines that a native client is installed, the method proceeds to 710. At 710, the portable application file requests that the native client launch the shared application using information contained in the portable application file, for example by making a system call to the underlying Operating System of the client device. In some aspects, the portable application file passes application and session information to the native client using inter-process communication (IPC), URL Scheme or the like. Alternatively, the portable application file passes a URL to access the application session to the native client via IPC.

At 712, the native client launches the shared application using the provided application link or using the provided parameters of the application from step 710.

Figure 8:
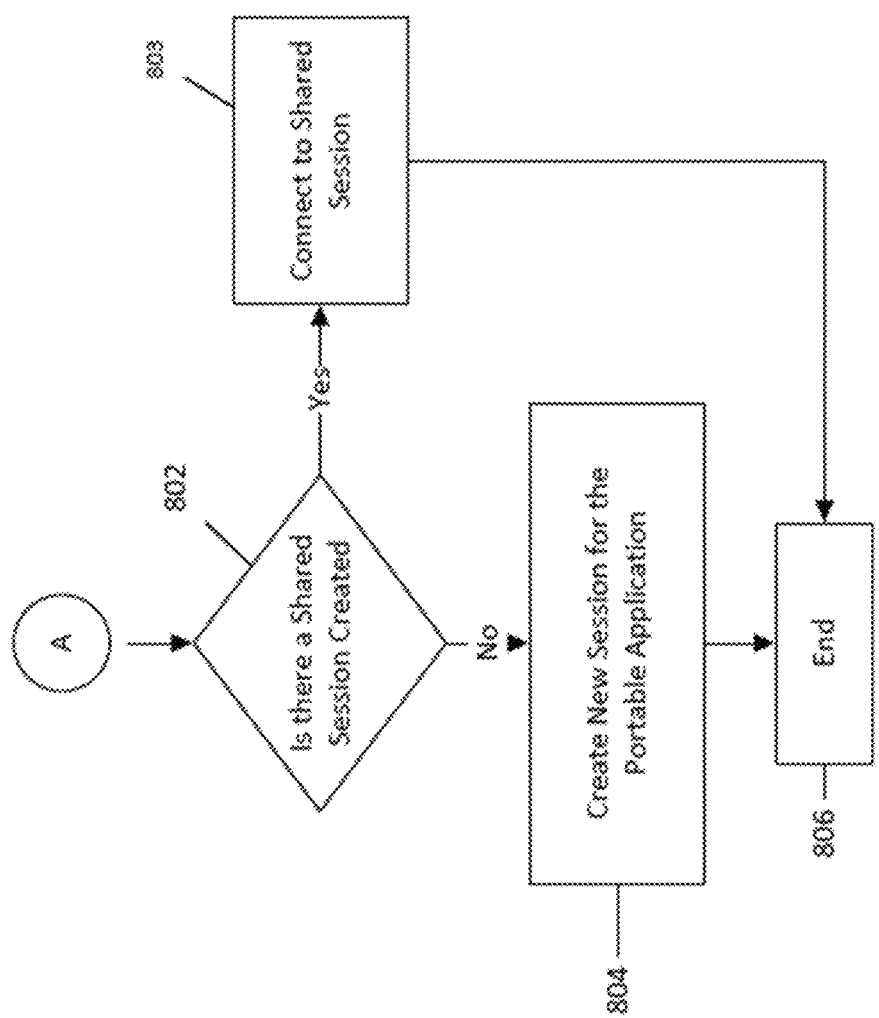

The method then proceeds to step 802 of FIG. 8.

At 802, the RAS Gateway determines whether there is a shared session that is already created. In other words, the RAS Gateway 101 determines whether the user who shared the application link or portable application file still has a session in progress.

If it is determined at 802 that the shared session exists, the method proceeds to 803, where the user is connected to the shared session identified in the portable application file. According to exemplary embodiments, connecting to the shared session comprises native shadowing or can view shared sessions because of the session management module 110.

However, at 804 if the RAS Gateway 101 determines that a there is no shared session that is active or established, the RAS Gateway 101 creates a new session for the portable application. The current user can then share their session by providing the portable application file to other users.

The method 800 terminates at 806.

Figure 9:
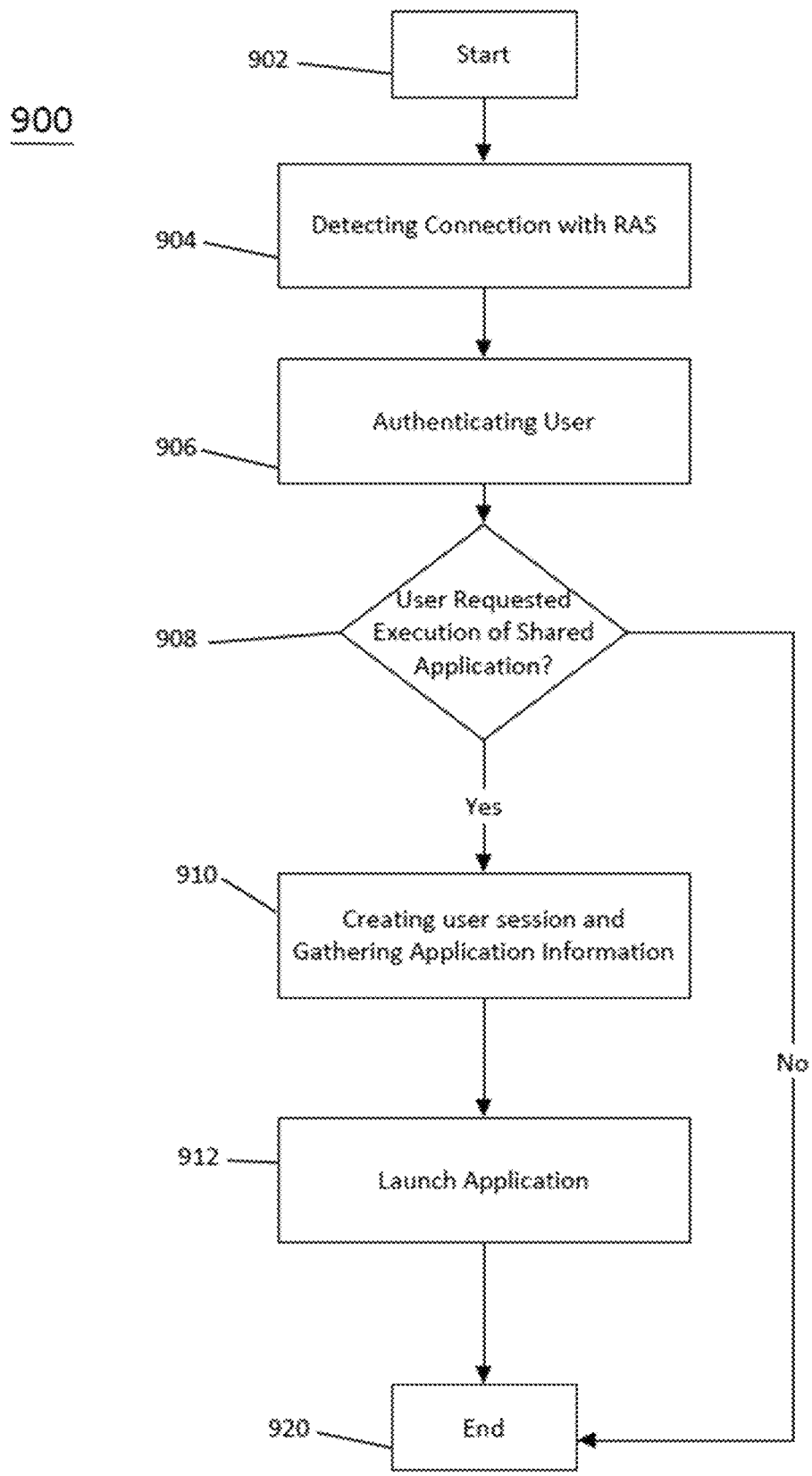
FIGS. 9-10 are flowcharts illustrating another method for remote application sharing, according to an exemplary aspect of the disclosure

FIG. 9 is a flowchart illustrating another method 900 for sharing a session of a remote application, according to an exemplary aspect of the disclosure.

The method 900 begins at 902 and proceeds to step 904.

At 904, a remote application server (RAS) detects that a user is attempting to establish a connection with the remote application server.

At 906, the remote application server authenticates the user based on login information associated with the user. In some aspects, the user enters the information manually, while in other aspects, user identification information is extracted from the client device they are using, or through session variables.

The remote application server provides a listing of applications that are published for access by the user, based on their credentials and profile.

At 908, the remote application server determines that the user has requested execution of a shared application hosted on the remote application server from among the list of published applications.

Responsive to determining that the user has requested execution of the shared application, the remote application server gathers information for accessing the shared application hosted on the remote application server at step 910. Otherwise, the method proceeds to 920 where method 900 terminates.

At 912, the remote application server launches the shared application. In some aspects, when a shared application is published, the application is available in the application listing when the user logs into the client and can be launched directly.

The method 900 terminates at 920.

Figure 10:
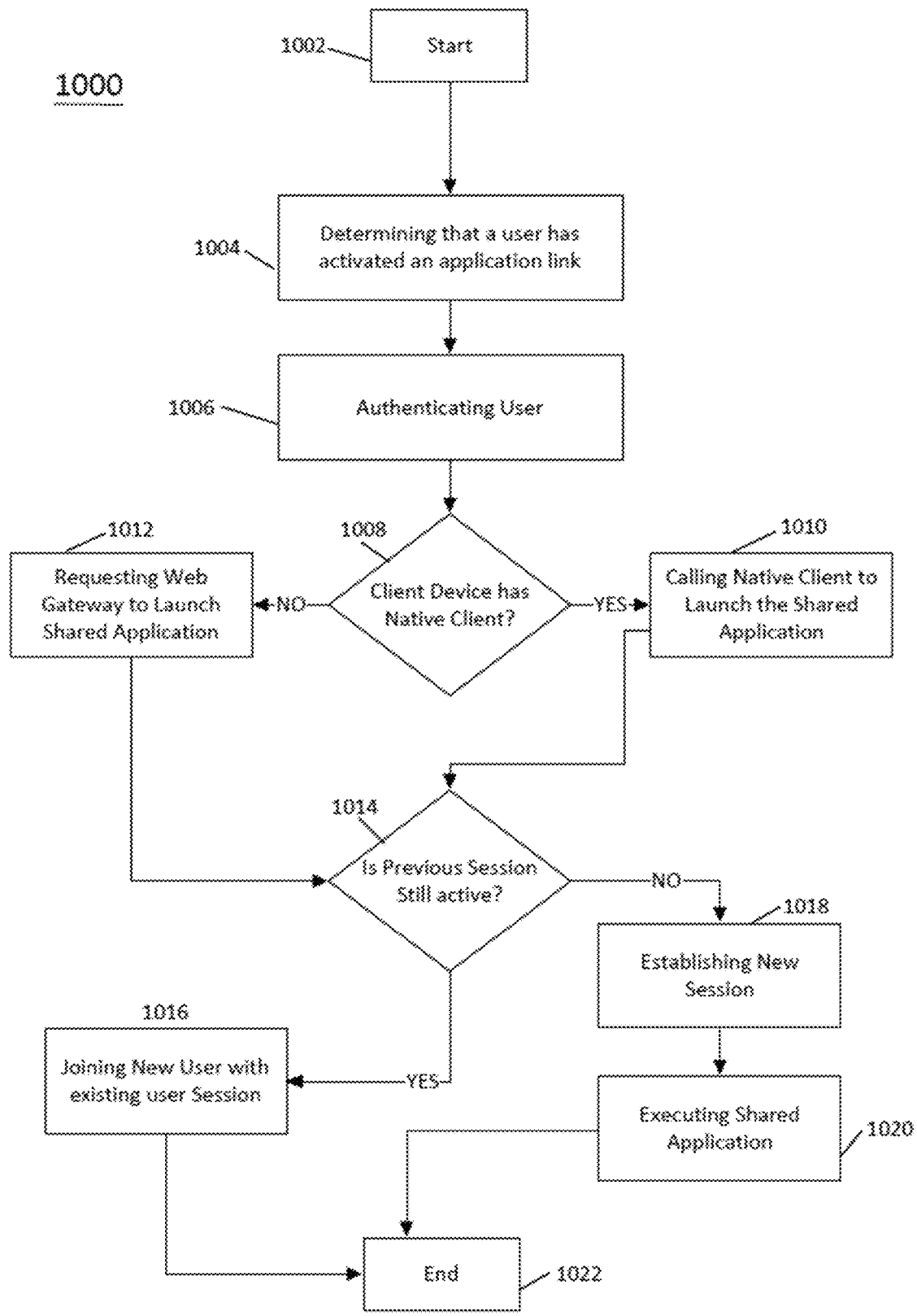

FIG. 10 is a flowchart illustrating another method 1000 for joining a shared session of a remote application, according to an exemplary aspect of the disclosure.

The method begins at 1002 and proceeds to 1004, where the remote application server determines that a new user has activated an application link that was shared with the new user. In one aspect, this comprises hosting, at the indicated URL of the application link, a service that receives incoming application session sharing requests.

At 1006, the new user is authenticated based on their credentials, either manually input or collected from the session or client device of the new user.

At 1008, the remote application server determines, via an operating system call to the client device, whether the client device has a native client installed. If the client device has a native client installed, the native client is used called to launch the shared application at 1010. Otherwise, the web gateway is requested to launch the shared application at 1012.

The method proceeds to 1014, where the remote application server determines whether the previous session, e.g., the session initiated by a user wishing to share their remote application session, is currently active.

If the connection is active, the method proceeds to 1016, where the new user joins the existing user session, according to methods described above. If the connection is not active, or not available, the method proceeds to 1018, where a new session is established.

At 1020, the shared application indicated in the application link is launched in the new session.

The method terminates at 1022.

In general, the term "module" as used herein can refer to a software service or application executed as part of the system 100. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and methods are described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 11:
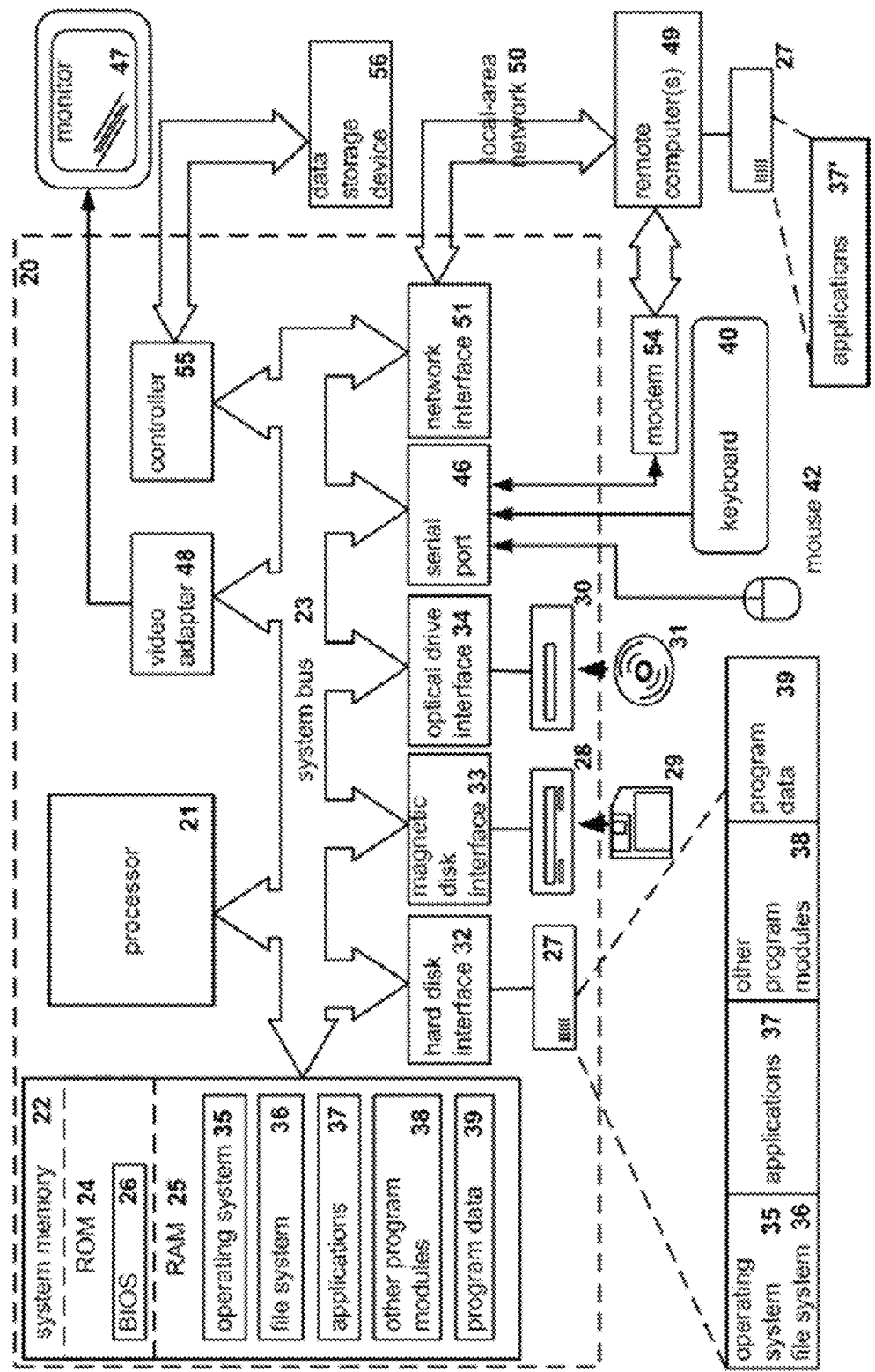
FIG. 11 is a block diagram of a general-purpose computer system on which the disclosed system and method can be implemented according to an exemplary aspect of the disclosure.

FIG. 11 is a block diagram illustrating a general-purpose computer system 20 on which aspects of systems and methods for remote application sharing may be implemented in accordance with an exemplary aspect. It should be noted that the computer system 20 can correspond to the system 100, system 200 or any components therein.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for sharing a session of a remote application, comprising:
   detecting, by a web gateway, a logging on of a user to the web gateway where the web gateway is connected to a remote application server (RAS) gateway;
   determining, with the web gateway, that the user has requested to share an application of a collection of one or more applications;
   transmitting the request to the RAS gateway;
   generating, with the RAS gateway, one of an application link and a portable application file comprising a link, connection details for connecting to the RAS gateway, and other connection details for joining an application session associated with the shared application;
   transmitting the one of the application link and the portable application file from the RAS gateway to the web gateway; and
   sharing the one of the application link and the portable application file with an other user; wherein
   the collection of one or more applications are software applications that have been published through the RAS.

2. The method according to claim 1, further comprising
   determining with the web gateway in dependence upon use of the one of the application link and the portable application file by the other user whether a client device has a native client installed;
   upon a positive determination that the client device has the native client installed executing a process comprising:
   transmitting a request from the web gateway to the client device to launch the shared application; and
   launching the shared application with the native client of the client device using the provided one of the application link and the portable application file; and
   upon a negative determination that the client device has the native client installed launching the shared application with the web gateway; wherein
   the native client is an executable file that launches a remote session with a RAS via the RAS gateway via one or more communication channels of a plurality of communication channels; and
   an operating system of the client device prevents the web gateway from accessing the native client and thereby determining that the native client is installed.

3. The method according to claim 1, further comprising
   determining with the web gateway in dependence upon use of the one of the application link and the portable application file by the other user whether a client device has a native client installed;
   upon a positive determination that the client device has the native client installed executing a process comprising:
   transmitting a request from the web gateway to the client device to launch the shared application;
   transmitting one or parameters for launching the shared application from the web gateway to the client device; and
   launching the shared application with the native client of the client device using the provided one of the application link and the portable application file and the one or more parameters; and
   upon a negative determination that the client device has the native client installed launching the shared application with the web gateway; wherein
   the native client is an executable file that launches a remote session with a RAS via the RAS gateway via one or more communication channels of a plurality of communication channels; and
   an operating system of the client device prevents the web gateway from accessing the native client and thereby determining that the native client is installed.

4. A method for sharing a session of a remote application, comprising:
   generating, with a remote application server (RAS) gateway, one of an application link and a portable application file in response to receipt of a request from a user by a web gateway connected to the RAS gateway to share an application of a collection of one or more applications where the one of the application link and the portable application file comprises a link, connection details for connecting to the RAS gateway, and other connection details for joining an application session associated with the shared application;

transmitting the one of the application link and the portable application file from the RAS gateway to the web gateway; and sharing the one of the application link and the portable application file with an other user; wherein the collection of one or more applications are software applications that have been published through the RAS.

5. The method according to claim 4, further comprising determining with the web gateway in dependence upon use of the one of the application link and the portable application file by the other user whether a client device has a native client installed;

upon a positive determination that the client device has the native client installed executing a process comprising:

transmitting a request from the web gateway to the client device to launch the shared application; and launching the shared application with the native client of the client device using the provided one of the application link and the portable application file; and upon a negative determination that the client device has the native client installed launching the shared application with the web gateway; wherein the native client is an executable file that launches a remote session with a RAS via the RAS gateway via one or more communication channels of a plurality of communication channels; and an operating system of the client device prevents the web gateway from accessing the native client and thereby determining that the native client is installed.

6. The method according to claim 4, further comprising determining with the web gateway in dependence upon use of the one of the application link and the portable application file by the other user whether a client device has a native client installed;

upon a positive determination that the client device has the native client installed executing a process comprising:

transmitting a request from the web gateway to the client device to launch the shared application;

transmitting one or parameters for launching the shared application from the web gateway to the client device; and launching the shared application with the native client of the client device using the provided one of the application link and the portable application file and the one or more parameters; and upon a negative determination that the client device has the native client installed launching the shared application with the web gateway; wherein the native client is an executable file that launches a remote session with a RAS via the RAS gateway via one or more communication channels of a plurality of communication channels; and an operating system of the client device prevents the web gateway from accessing the native client and thereby determining that the native client is installed.

7. A method for sharing a session of a remote application, comprising:

receiving upon a client device one of an application link and a portable application file from a web gateway provided to the web gateway by a remote application server (RAS) gateway in dependence upon a request to share the one of the application link and the portable application file with an other user of the client device; wherein the one of the application link and the portable application file were generated by the RAS gateway in response to receipt of a request from a user of an other client device received via the web gateway to share an application of a collection of one or more applications;

the one of the application link and the portable application file comprises a link, connection details for connecting to the RAS gateway, and other connection details for joining an application session associated with the shared application; and the collection of one or more applications are software applications that have been published through the RAS.

8. The method according to claim 7, further comprising determining with the web gateway in dependence upon use of the one of the application link and the portable application file by the other user whether the client device has a native client installed;

upon a positive determination that the client device has the native client installed executing a process comprising:

transmitting a request from the web gateway to the client device to launch the shared application; and launching the shared application with the native client of the client device using the provided one of the application link and the portable application file; and upon a negative determination that the client device has the native client installed launching the shared application with the web gateway; wherein the native client is an executable file that launches a remote session with a RAS via the RAS gateway via one or more communication channels of a plurality of communication channels; and an operating system of the client device prevents the web gateway from accessing the native client and thereby determining that the native client is installed.

9. The method according to claim 7, further comprising determining with the web gateway in dependence upon use of the one of the application link and the portable application file by the other user whether the client device has a native client installed;

upon a positive determination that the client device has the native client installed executing a process comprising:

transmitting a request from the web gateway to the client device to launch the shared application;

transmitting one or parameters for launching the shared application from the web gateway to the client device; and launching the shared application with the native client of the client device using the provided one of the application link and the portable application file and the one or more parameters; and upon a negative determination that the client device has the native client installed launching the shared application with the web gateway; wherein the native client is an executable file that launches a remote session with a RAS via the RAS gateway via one or more communication channels of a plurality of communication channels; and an operating system of the client device prevents the web gateway from accessing the native client and thereby determining that the native client is installed.

* * * * *